United States Patent
McGrath

(10) Patent No.: US 11,645,485 B2
(45) Date of Patent: *May 9, 2023

(54) FACADE ELEMENT TRACKING SYSTEMS AND RELATED TECHNIQUES

(71) Applicant: M.G. McGrath Integrated Technologies, LLC, Maplewood, MN (US)

(72) Inventor: Michael P. McGrath, Maplewood, MN (US)

(73) Assignee: M.G. McGrath Integrated Technologies, LLC, Maplewood, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,689

(22) Filed: Apr. 1, 2022

(65) Prior Publication Data

US 2022/0222457 A1 Jul. 14, 2022

Related U.S. Application Data

(63) Continuation of application No. 16/907,558, filed on Jun. 22, 2020, now Pat. No. 11,328,143.

(60) Provisional application No. 62/867,708, filed on Jun. 27, 2019.

(51) Int. Cl.
*G06K 7/14* (2006.01)
*G06K 19/06* (2006.01)
*G06F 3/04842* (2022.01)
*G06V 10/22* (2022.01)

(52) U.S. Cl.
CPC ....... *G06K 7/1413* (2013.01); *G06F 3/04842* (2013.01); *G06K 19/06028* (2013.01); *G06V 10/235* (2022.01)

(58) Field of Classification Search
CPC ........... G06K 7/1413; G06K 19/06028; G06V 10/235; G06F 3/04842
USPC ...................................................... 235/462.01
See application file for complete search history.

(56) References Cited

U.S. PATENT DOCUMENTS

| | | |
|---|---|---|
| 7,020,580 B2 | 3/2006 | Peters et al. |
| 7,283,975 B2 | 10/2007 | Broughton |
| 10,339,550 B2 | 7/2019 | Rao et al. |
| 2007/0262040 A1 | 11/2007 | Mifsud et al. |
| 2017/0032302 A1 | 2/2017 | Lete et al. |
| 2017/0369258 A1 | 12/2017 | Degaray et al. |
| 2019/0149952 A1 | 5/2019 | Parks, Jr. et al. |

(Continued)

OTHER PUBLICATIONS

"U.S. Appl. No. 16/907,558, Non Final Office Action dated Jul. 27, 2021".

(Continued)

*Primary Examiner* — Allyson N Trail
(74) *Attorney, Agent, or Firm* — Schwegman Lundberg & Woessner, P.A.

(57) ABSTRACT

An automated system can be used for tracking facade elements such as panels, glazing, or related structures, such as to help facilitate processing (e.g., fabrication) of such elements. Such a system can also facilitate management of other aspects of a life-cycle of a facade element, such as including one or more of design management or field monitoring. Such a system can include generating a unique identifier that is specific to a particular article, such as a panel or frame member, for example. Such a unique identifier can be used to track the article through the fabrication process.

20 Claims, 11 Drawing Sheets

(56) References Cited

U.S. PATENT DOCUMENTS

2020/0410439 A1  12/2020  Blackburn et al.

OTHER PUBLICATIONS

"U.S. Appl. No. 16/907,558, Notice of Allowance dated Jan. 3, 2022".
"U.S. Appl. No. 16/907,558, PTO Response to Rule 312 Communication dated Mar. 21, 2022", 2 pgs.
"U.S. Appl. No. 16/907,558, Response filed Oct. 25, 2021 to Non Final Office Action dated Jul. 27, 2021", 8 pages.
"Barcoding in Construction: Inventories, Tools & Equipment", PowerTrack, (2018), 3 pgs.
"New AXYZ Software Simplifies Panel Tracking Process", http://whattheythink.com/news/94717-new-axyz-software-simplifies-panel-tracking-process/ Retrieved on Jun. 20, 2019, (Aug. 9, 2019), 2 pgs.
"Paneltracker Simplifies the Panel Tracking Process", https://www.axyz.com/us/2019/04/01/paneltracker-simplifies-the-panel-tracking-process/ Retrieved on Jun. 20, 2019, (Apr. 1, 2019), 3 pgs.

FACADE ELEMENT TRACKING SYSTEMS AND RELATED TECHNIQUES

CLAIM OF PRIORITY

This patent application is a continuation of Michael P. McGrath, U.S. patent application Ser. No. 16/907,558, titled "FACADE ELEMENT TRACKING SYSTEMS AND RELATED TECHNIQUES," filed on Jun. 22, 2020, which claimed benefit of Michael P. McGrath, U.S. Provisional Patent Application Ser. No. 62/867,708, titled "FACADE ELEMENT TRACKING SYSTEMS AND RELATED TECHNIQUES," filed on Jun. 27, 2019, the benefit of each of which is hereby presently claimed, and each of which is hereby incorporated by reference herein in its entirety.

FIELD OF THE DISCLOSURE

This document pertains generally, and not by way of limitation, to systems and techniques for facilitating fabrication and tracking of exterior and interior facades.

BACKGROUND

Facades may incorporate a variety of materials. For example, custom-designed residential, commercial, or industrial structures may involve use of many different configurations of facade materials, and such materials may include metallic, composite or unitized panels and related support structures such as frame elements or hardware. Such facades may also include stone, ceramic materials, polymer materials such as acrylic, glass, glazing and related support structures such as frame elements or hardware. Generally, fabrication of such facade elements may be performed off-site, and such elements may then be transported, and assembled or installed at a job site to form or clad part of a structure.

SUMMARY OF THE DISCLOSURE

In recent years, architectural facade elements such as metallic or composite panels have grown in popularity. Architects and structural designers are using such materials in increasingly complex configurations, such as involving thousands of panels in a single project, where each panel may have different specifications. Such specifications can include one or more of dimensions, curvature, shape, bend features (such as to provide mounting or support flanges or other features), surface finish, color, or texture, as illustrative examples. Each facade element, such as a support frame, a panel, or an assembly, is generally designed, engineered, fabricated, inspected, shipped and installed, in conformity with a master architectural design. Fabrication of such elements can involve several processing steps, and in some cases, may involve processing (e.g., fabrication or inspection) at multiple sites or across multiple vendors.

Management of the design, engineering, fabrication, inspection, shipment, and installation of facade elements can present various challenges. Generally, an architectural design for a structure may involve various revisions or changes driven by design preferences or practical considerations that arise as a project progresses. Facade elements such as metal or composite panels are generally fabricated in accordance with specifications extracted from the master design, and individual elements may include specifications that shift over the course of the project. Generally, facade elements can include a metal panel, a composite panel, a panel including glass, a portion of a metal panel assembly, a portion of a composite panel assembly, or a portion of a glass panel assembly, as examples.

Manual tracking of where a particular facade element, such as a panel, fits within the design, or whether the panel has been properly fabricated, can be cumbersome and error prone. Determining whether the element conforms to the desired specification also raise challenges, because inspection criteria might also change over the duration of a project. The present inventor has recognized, among other things, that the fabrication of hundreds or even thousands of unique elements can present daunting challenges from a logistical perspective, such as with respect to tracking which panels have been properly fabricated, inspected, or shipped.

Various process failures such as duplication of effort, re-work, wasted material, or project delays may occur due to difficulties involved in tracking, inspecting, shipping, or properly installing such elements, particularly when no automated tracking is performed. For example, absent the teachings related to the systems and techniques described herein, supervisors and managers responsible for fabrication of such facade elements may have only limited visibility into where process bottlenecks or quality issues are occurring, Even if an organization were aware of such difficulties, a lack of traceability extending from the design all the way to the field may preclude helpful revisions to the process or changes to the panel configuration.

To address such challenges, the present inventor has also recognized, among other things, that an automated system for tracking facade elements such as panels, glazing, or related structures, can help facilitate processing of such elements. Such a system can also facilitate management of other aspects of a life-cycle of a facade element, such as including one or more of design, material handling, project management and field monitoring. Such a system can include generating a unique identifier that is specific to a particular article, such as a panel or frame member, for example. The unique identifier can be a portion of a label or other indicium affixed to the article (e.g., including a bar code or other information), and can be used to provide traceability of a particular article to a referenced design (e.g., relating the unique identifier to a "release" identifier), or to track one or more of fabrication, inspection, re-work, shipping, installation, and field performance of the article. The article can include a facade element that is installed as an architectural feature of a building.

In an example, a technique such as a computer-implemented or otherwise machine-implement method for tracking of facade elements for a structure can include receiving an identifier indicative of a facade element, the identifier scanned from the facade element, and in response, without requiring further user input, automatically retrieving a record corresponding to the facade element and generating a presentation for a user indicative of at least a portion of the record. The presentation can include an indicium of a status of the facade element relative to a specified project comprising multiple facade elements and at least two selectable elements, the two selectable elements including a first selectable element that, in response to user selection, alters the status of the facade element within the record and a second selectable element that, in response to user selection, triggers generation of a presentation for the user prompting the user to provide data indicative of a result of an inspection operation for the facade element.

For example, in response to user selection of the second selectable element, the technique can include generating a presentation for the user prompting the user to provide an image and a corresponding description documenting the inspection operation. The corresponding description can include a defect or inspection (e.g., one or more of quality monitoring, control, or assurance) report, and a status of the of the facade element can be updated in response to a received indication from a user indicative of whether the facade element satisfies one or more criteria corresponding to the inspection operation, such as after rework or supplemental inspection. In an example, in response to receiving the identifier indicative of the facade element, a presentation can be generated comprising a graphical representation of at least a portion of the specified project including a visual indicium showing a location of the facade element amongst other ones of the multiple facade elements in an installation.

In an example, a technique as shown and described herein can be implemented using a system. For example, a system for tracking of facade elements for a structure can include a user device comprising at least one processor circuit and at least one memory circuit, the memory circuit comprising instructions that, when executed by the at least one processor circuit, cause the user device to receive an identifier indicative of a facade element, the identifier scanned from the facade element. In response, without requiring further user input, a record can be automatically retrieved corresponding to the facade element and generate a presentation for a user indicative of at least a portion of the record, the presentation including an indicium of a status of the facade element relative to a specified project comprising multiple facade elements and at least two selectable elements, the two selectable elements including a first selectable element that, in response to user selection, alters the status of the facade element within the record and a second selectable element that, in response to user selection, triggers generation of a presentation for the user prompting the user to provide data indicative of a result of an inspection operation for the facade element.

In an example, the user device is coupled to a display or comprises a display and the instructions comprise instructions to, in response to user selection of the second selectable element, generate a presentation for the user prompting, via the display, the user to provide an image and a corresponding description documenting the inspection operation. A portion of the system such as the user device, can include or can be communicatively coupled to at least one of an optical scanner or a camera. The instructions to receive the identifier can include instructions to receive data indicative of the identifier obtained using the optical scanner or the camera, the identifier encoded using a bar code applied to the facade element.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
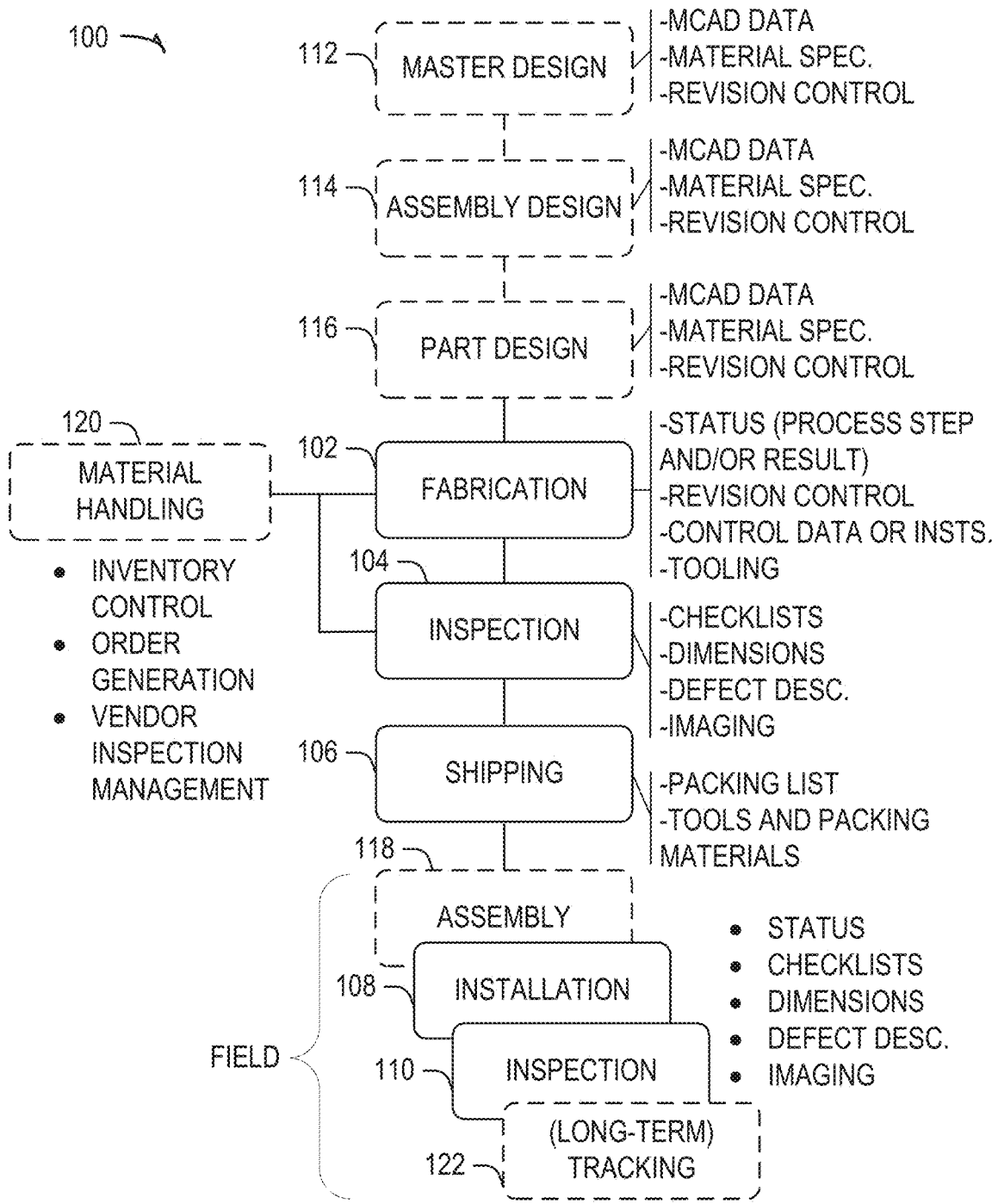
FIG. 1 illustrates generally an illustrative example comprising a framework that can be used for one or more of design, engineering, fabrication, inspection, shipment, and installation, such as facilitated by a system or technique including automated tracking as provided by the present subject matter.

An automated system and related techniques as shown and described herein can be used for tracking facade elements such as panels, glazing, or related structures, such as to help facilitate processing (e.g., fabrication) of such elements. Such a system can also facilitate management of other aspects of a lifecycle of a facade element, such as including one or more of design management and field monitoring. Such a system can include generating a unique identifier that is specific to a particular article, such as a panel or frame member, for example. Such a unique identifier can be used to track the article through the fabrication process, and optionally, throughout one or more of installation and field-monitoring phases of the lifecycle, such as a life-cycle illustrated generally in the example of the framework 100 of FIG. 1. Generally, as mentioned above and elsewhere herein, an automated system for facade element tracking can include one or more of the following examples. For example, facade elements such as parts being fabrication can be tracked back to the electronic databases such as computer-aided-design (CAD), computer aided manufacturing (CAM) or a representation thereof, including one or more of assignment of a tracked article to a corresponding design release, presentation of a design representation (e.g., a two-dimensional projection or a three-dimensional representation) where a tracked article can be called out in response to receiving a unique identifier or a design release reference, or presentation of a design representation where a selection of a portion of the design representation by a user can trigger presentation of one or more of data about the design release, status information with respect to articles corresponding to the design release, or other reporting.

Facade elements can be tracked through fabrication, such as using electronic scanners (e.g., optical bar code scanners) to receive an indication that an article has entered (e.g., initiated) or exited (e.g., completed) a processing step. Such processing steps can include one or more of: design release (e.g., approval of a design for fabrication), cutting or machining, punching or drilling, bending, marking, surface treating (e.g., painting, texturing, passivating, plating, or the like), inspecting, storing, crating, shipping, unloading, or installing, as illustrative examples. Scanning of an article can trigger other processing operations, such as triggering presentation of a checklist or instructions, requesting a photo of an article, or performance of inspection step, such as including prompting a user to enter or transmit data (e.g., indicative of a measurement result or observation). Scanning of an article can trigger generation of a report or trigger retrieval or presentation of information or analytics, relating to tooling, setup data (e.g., a cutting program for CNC or laser cut operation), or other information to facilitate fabrication, such as traceable to a specified design reference associated with the article unique identifier. Tracking of facade elements can include managing shipment of such elements, such as facilitating automated generation of a packing list by receiving scanned indicia of unique references of articles as they are prepared for loading or loaded into a shipping container such as a crate. For example, scanning of an article can trigger inclusion of other items in the packing list, such as prompting the user to include certain tools, personal protective equipment (PPE), packing materials, or to perform other tasks. For example, scanning a particular article can trigger a user to take a photo of the article after being crated, such as may be required under contract or for insurance purposes.

In an example, tracking of facade elements can occur before, during, or after installation, such as using electronic scanners (e.g., optical bar code scanners) to receive an indication that an article has entered (e.g., initiated) or exited (e.g., completed) an installation step. Such installation steps can include one or more of: assembling, punching or drilling, bending, marking, cutting, fastening, inspecting, or installing, as illustrative examples. Scanning of an article can trigger other processing operations, such as triggering presentation of a checklist or instructions, requesting a photo of an article, or performance of inspection step, such as including prompting a user to enter or transmit data (e.g., indicative of a measurement result or observation).

In an example, scanning of an article can trigger generation of a report or trigger retrieval or presentation of information and analytics, relating to information to facilitate installation, such as traceable to a specified design reference associated with the article unique identifier. For example, reports can be generated pertaining to status of facade elements, such as with respect to processing steps, defect rates or instances, by design reference (e.g., sorted by design release), or relating to other criteria, such as to facilitate project management or monitoring of productivity. Tracking using systems and techniques as described herein can include one or more of generation of forms relating to completion of a portion or an entirety of the fabrication process or relating to aspects such as inspection or defect observations. Tracking using systems and techniques as described herein can include integration with outside vendors or tools, such as to receive data such as indicative of inspection or fabrication operations and to aggregate such data with other data relating to an article unique identifier, or tracking of facade element performance in the field, such as allowing entry of inspection or defect observations that can be aggregated with a record corresponding to an article unique identifier, as further illustrative examples. Operations and data that can be tracked, generated, or automatically retrieved in response to receiving a unique identifier are shown illustratively in the example of the framework 100 of FIG. 1.

FIG. 1 illustrates generally an illustrative example comprising a framework 100 that can be used for one or more of design, engineering, fabrication, inspection, shipment, and installation, such as facilitated by a system or technique including automated tracking as provided by the present subject matter. The techniques and systems described herein, such as the system 200 of the example of FIG. 2 and the technique 300 of the example FIG. 3, can be used to support a portion or an entirety of the framework 100 shown in FIG. 1.

For example, in FIG. 1, fabrication 102 of a facade element such as a metal or composite panel, generally involves receiving a specification, such as specified by a part design 116. The part design may be described using a physical specification drawing or using mechanical computer-aided design (MCAD) data, such as accompanying a material specification. Releases or other revisions of the part design 116 can be maintained, such as to provide tracking of changes occurring throughout a design or build process. The techniques described herein can associate one or more of data from a master design 112, assembly design 114, or part design 116 with a part being fabricated before or during fabrication 102, such as tracked by a unique, scannable identifier affixed to the part or otherwise applied to the part (e.g., a bar code or a wirelessly-readable tag such as a radio-frequency identification tag).

The fabrication 102 can include various operations, such as one or more of a machining operation, a folding operation, a scoring operation, or a cutting operation, as illustrative examples. Using the techniques described herein, a status of a part being fabricated can be tracked, and setup or configuration data such as control data for fabrication equipment can be automatically retrieved or related prompts to operators can be generated in response to a receiving a unique identifier associated with a part. A tracking system as shown and described herein can generate automated alerts or notifications (e.g., "push" notifications such as email or wirelessly-delivered messages such as SMS messages), such as in response to specified criteria. For example, completion of individual elements or groups of elements can be used to trigger reporting or such reporting can be automatically generated on a specified (e.g., recurring) basis. In another example, notifications can be generated when one or more defect reports are received, or when a defect rate corresponding to specified project, specified assembly, or specified part exceeds a specified rate or other criterion.

During or after fabrication 102, an inspection 104 can be performed. The inspection may include use of one or more standardized or part-specific checklists (e.g., a questionnaire or other form). Such inspection 104 can include verifying dimensional specifications, such as according to criteria relating to a shape or location of a scribe, an etch, a cut, or a fold in a facade element. Other inspection criteria can include subjective or objective measures of surface texture, surface finish, color, or evidence of visible defects such as scratches or dents, as illustrative examples.

Fabrication 102 and inspection 104 of individual facade elements such as panels, or related assemblies, may occur at a manufacturing site, and the facade elements are then transported to a job site in order to be installed. The framework 100 can include a shipping 106 operation, such as where a packing list is generated, any required tools or packing materials are gathered, and a shipping container such as a crate or pallet is prepared. In the field (such as at or nearby the job site), installation 108 can be performed, and other operations such as intermediate or final inspection 110 can also be performed. Assembly 118 may occur in the field, such as during or prior to installation 108. For example, composite, metallic, ceramic, polymer (e.g., acrylic) or glass elements can be mated with relating support elements such as frame structures, or groups of such elements can be assembled than installed as a unit, as illustrative examples. Data tracked in the field can include one or more of status of individual elements (e.g., received in field, installation in-process, installation complete, unit defective, etc.). Such data can include one or more checklists such as for quality assurance or defect reporting, or other data such as specified dimensions, actual measured dimensions, notes concerning defects or inspection results, or imaging. Longer-term monitoring activities (e.g., extending beyond project completion) can also be tracked, such as for purposes of monitoring for aging (e.g., corrosion, fading) or defects concerning fit or detachment, as illustrative examples.

The framework 100 shown in FIG. 1 can include other elements, such as material handling 120. Material handling 120 can be defined as one or more of inventory control (e.g., tracking of raw materials, intermediate goods, or finished parts or assemblies, as examples). Material handling 120 can include generation of order or management of data from vendors, such as vendor fabrication data or inspection data (e.g., to facilitate quality assurance or provide for auditing capability).

The framework 100 shown in FIG. 1 can include other elements, such as management or storage of a master design 112 (e.g., such as defined by MCAD data, material specifications, and subject to revision control). The master design 112 can define one or more assemblies, such as described by an assembly design 114 (e.g., similarly defined by one or more of MCAD data, material specifications, or revision level). One or more of the master design 112 (e.g., corresponding to a specified project) or assembly design 114 may specify individual part designs 116, such as corresponding to individual ones of facade elements (if unique) or to groups of facade elements having similar specifications. For example, within the context of a facade element tracking system as described herein, a specified design can include a master design having one or more associated assembly designs, with such assembly design having one or more associated part designs, such defined in a hierarchical manner.

Figure 2:
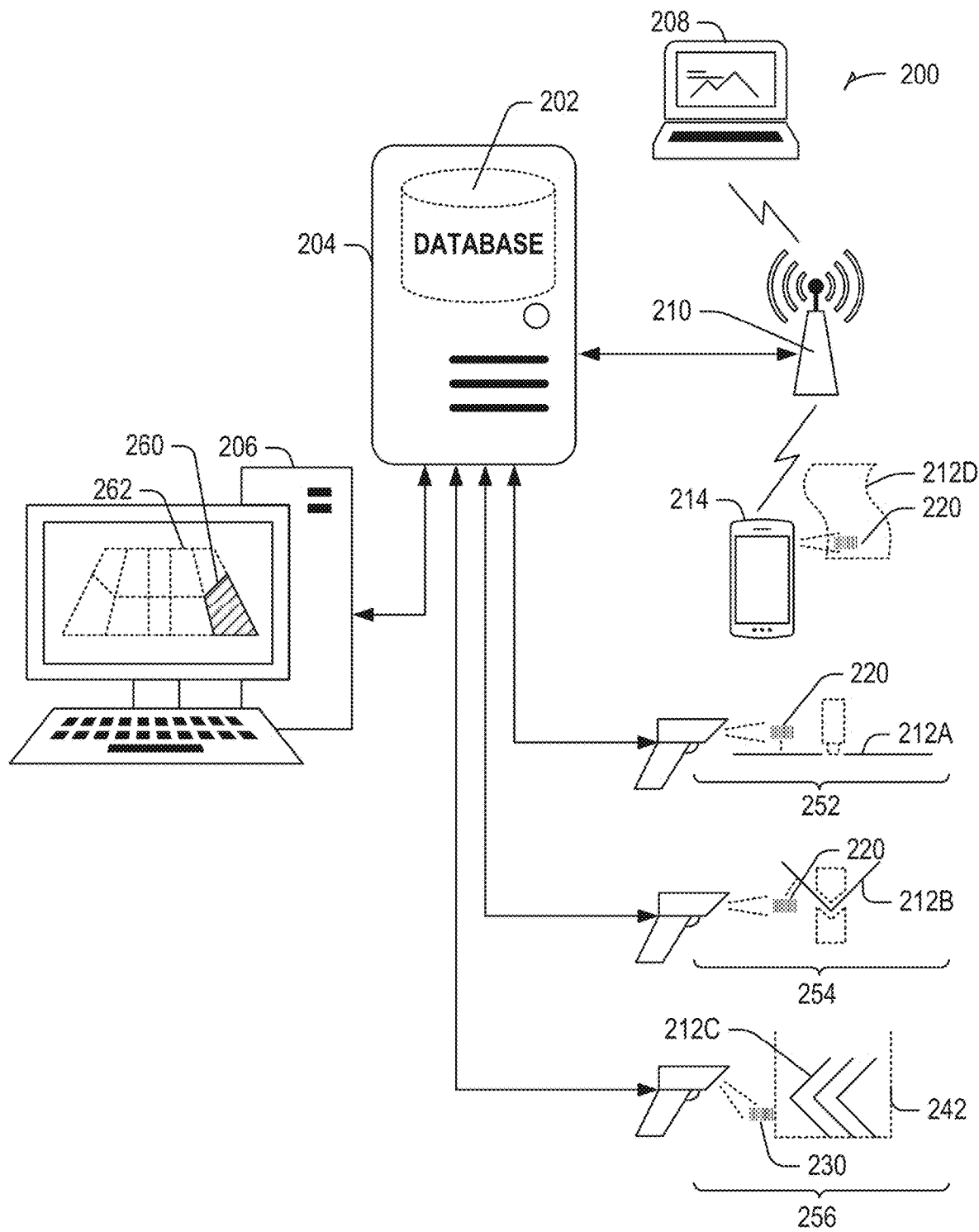
FIG. 2 illustrates a block diagram of an example comprising a system upon which any one or more of the techniques discussed herein may be performed.

FIG. 2 illustrates a block diagram of an example comprising a system 200 upon which any one or more of the techniques discussed herein may be performed, such as to support tracking of operations as shown generally in the framework 100 of FIG. 1. The system 200 of FIG. 2 can include either a centralized server 204 or cloud-based service, such as to provide a database 202 that can store data indicative of unique identifiers corresponding to facade elements. A facade element can include a metallic or composite panel 212D or other part, and an indicium of the unique identifier, such as a bar code 220, can be affixed to the panel 212D or otherwise indicated on the panel (e.g., by etching, laser marking, mechanically scribing, etc.). The system 200 can track a facade element from design through fabrication, shipping, and installation, such as integrating with computer-aided design tools. For example, data indicative of a portion or an entirety of an architectural facade design 262 can include design data concerning respective elements (such as a panel 260). The panel 260 design data itself or a unique design reference identifier can be provided for storage in the database 202. Tracking of initiation of work, completion, re-work, or defects can be performed during the fabrication process. For example, processing operations such as laser cutting 252 (or mechanical cutting, for example), can include scanning the bar code 220 to indicate that a panel 212A is entering or exiting the laser cutting 252 operation. For example, scanning the bar code 220 can prompt a controller of the laser cutting 252 to automatically load or prompt loading of an appropriate control program corresponding to the design 260 for the panel 212A.

Tracking can occur before, during, or after other processing, such as performed automatically or in response to a user input, such as including scanning or reading of an identifier. For example, the bar code 220 can be scanned before, during, or after a bending operation 254. Inspection can also be triggered, such as automatically obtaining a measurement or prompting an operator to measure a panel 212B after completion of a bend operation. The tracking scheme shown herein can also be used to facilitate generation of packing lists, such as allowing completed panels 212C to be individual scanned as loaded into a crate 242, with a separate bar code 230 being one or more of generated or scanned to relate a unique crate identifier to the panels 212C within the crate. A photo or other documentation can be obtained either automatically or via generation of a prompt to a user, such as to document a condition of the crate 242 before shipment.

Tracking can also be performed in the field, such as using a mobile device 214. The mobile device 214 (or a tablet or other device) can be linked back to the server 204, such as via a wireless network 210. Other device can access the tracking data, such as for reporting or quality evaluation, such as using a laptop 208 or other device, communicatively coupled to the server 204 either through a wired or wireless network 210 (e.g., a local area network or a cellular data network, for example).

One or more of the aspects of the subject matter mentioned above or elsewhere herein can be instantiated in a run-time version of the tracking system 200, such as a mobile device or tablet application, such as without requiring an always-on network or cellular data connection. The system 200 can queue information obtained using the mobile device or tablet application for later transmission to a repository, such as a database 202 located centrally in a server 204 or provided by a cloud-based facility.

In an example, a system 200 as described herein can include a repository of data concerning the association between an article unique identifier and other information such as one or more of a design reference (e.g., a design release corresponding to the article), a status regarding one or more process steps such as fabrication operations, observations or inspection results including indicia of acceptance of quality or defect, an indicium of rework or scrap, data concerning shipping or receipt of the article, installation, or field observations, as illustrative examples. The repository can be a relational database 202, such as accessible using an SQL scheme, and the repository can be either centralized or cloud-based, such as decentralized or mirrored. The database 202 can be accessed by a client, such as a server providing a web-based user interface or an Application Programming Interface (API) facilitating integration with a mobile device or tablet application. The system can be configured to receive data (such as via a wired or wireless network connection) from a client device, such as a workstation, mobile device, or tablet, or such as obtained by a hand-held or permanently-installed scanner or camera. Such data can include the unique identified as scanned by a hand-held scanner or camera. The system 200 can perform various operations automatically, such as generating one or more presentations for interaction with a user automatically in response to a scanned identifier. In this manner, users, such as operators of fabrication equipment, can interact with the tracking system in an intuitive manner and with one or more of reduced labor or reduced error as compared to manual tracking approaches. For example, in a manual approach, a work order for fabrication of a part may be provided on paper and an operator may need to manually review the work order and determine appropriate further actions. A risk may exist that incorrect fabrication setup or materials may be used, and completion of a fabrication operation may involve manually documenting such completion such as by annotating a physical form or physically placing completed parts in another location for further processing.

The present inventor has recognized, among other things, that such operations are error prone and provide poor or no visibility to management or partners concerning productivity, completion, or defect rates, as illustrative examples. The present inventor has also recognized, among other things, that errors can be made, such as during one or more of fabrication, shipping, or installation. Use of systems and techniques as shown and described herein (e.g. a system 200 such as can be used to perform techniques as shown in one or more of FIG. 3, FIG. 4, or FIG. 5) can assist in one or more of suppressing such errors or providing early identification of emerging quality issues such as material or fabrication defects, or even design flaws precluding or inhibiting installation. Such a system solves a technical problem of providing a simplified user interface and central repository for such information, including capability to track installation and defects without requiring extensive data entry by users. Such a system can provide a user environment, such as a graphical user interface, to allow a uniform user experience implementing the techniques shown herein in a commonly-shared environment, such as accessible using a web browser or run-time client application.

Figure 3:
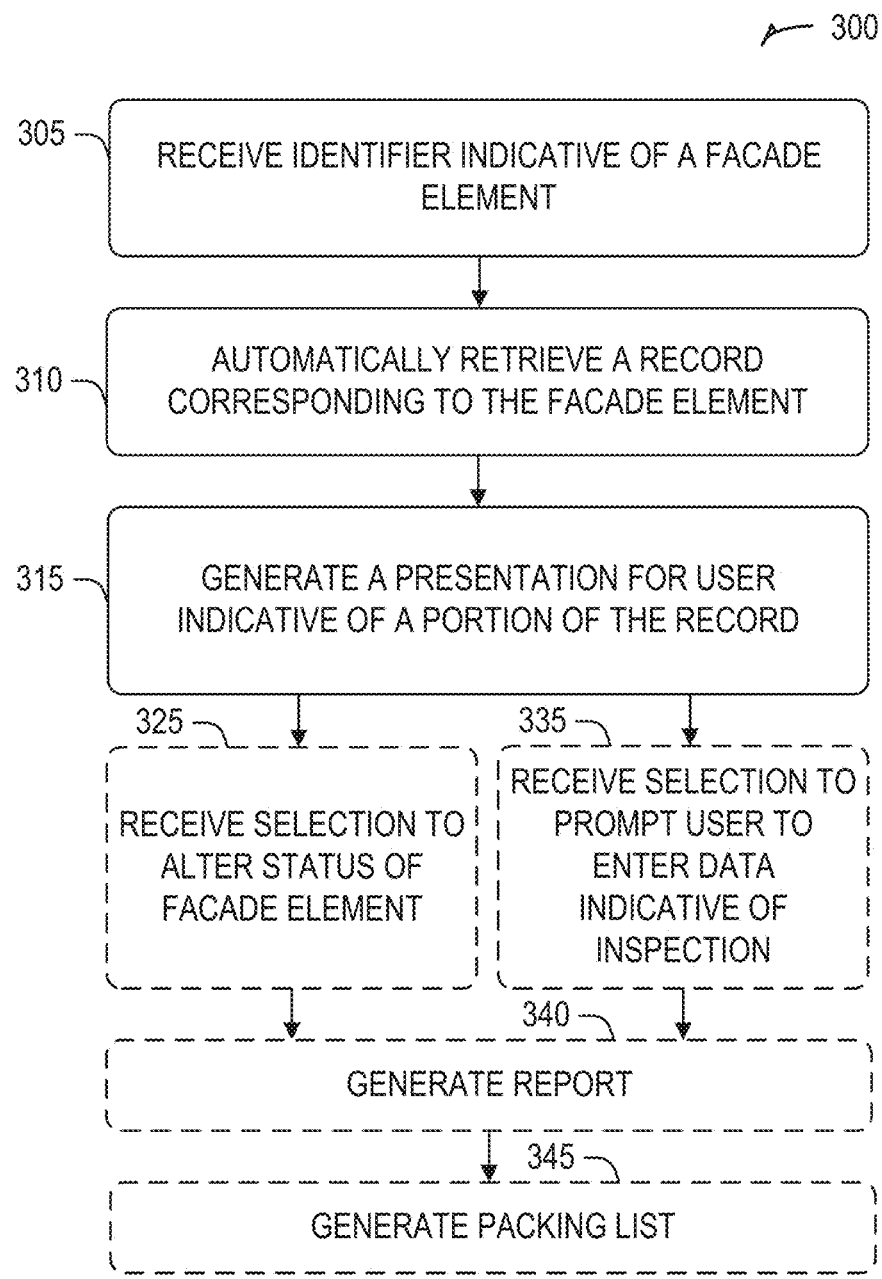
FIG. 3 illustrates generally a technique, such as a computer-implemented method, showing an example comprising receiving an identifier indicative of a facade element and generating a presentation for a user indicative of at least a portion of a record automatically retrieved in response to the received identifier.
Figure 6:
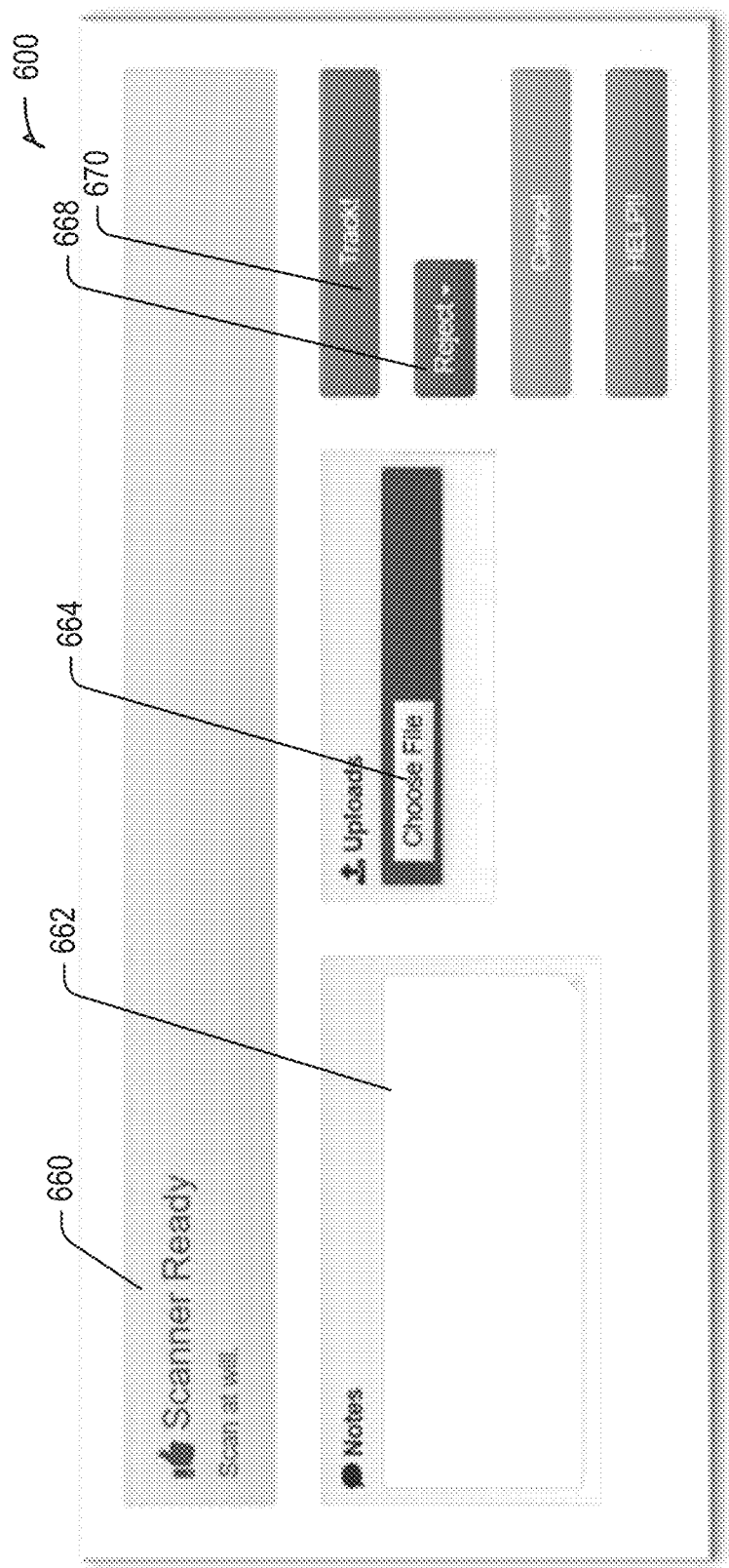
FIG. 6 illustrates generally an illustrative example comprising a presentation, such as can be presented to a user to provide a graphical user interface for interaction with automation provided by a facade element tracking system.

FIG. 3 illustrates generally a technique 300, such as a computer-implemented method, showing an example comprising receiving an identifier indicative of a facade element at 305 and at 315 generating a presentation for a user indicative of at least a portion of a record automatically retrieved in response to the received identifier. In the example of FIG. 3, a user such as an operator of fabrication equipment or a material handling person can scan a unique identifier associated with a facade element such as a part or an assembly. The user need not otherwise enter any information concerning the status or nature of the element. For example, the user may have a unique identifier such as a bar code or proximity-based identification badge identifying the user. Once the user has been authenticated, a presentation can be generated prompting the user to scan an identifier corresponding to a facade element, such as associated with a part or assembly being tracked through production or installation. For example, a workstation such as at a manufacturing site can have an idle state requesting a user to scan an identifier such as a bar code. FIG. 6 illustrates generally an illustrative example of such a presentation. Such a presentation can be presented using a desktop computer, a laptop computer, an operator interface on a piece of fabrication equipment, or a mobile device such as a cellular phone or tablet, as illustrative examples.

In the illustrative example of FIG. 3, and as applicable to other examples herein, the receiving the identifier indicative of a facade element at 305 can include scanning a bar code or interrogating a radio-frequency identification (RFID) tag. In response, at 310, without requiring further user input, a record corresponding to the facade element can be retrieved, and a presentation can be generated at 315 for a user indicative of at least a portion of the retrieved record. The presentation can include an indicium of a status of the facade element relative to a specified project comprising multiple facade elements and at least two selectable elements, the two selectable elements including a first selectable element that, in response to user selection, alters the status of the facade element within the record and a second selectable element that, in response to user selection, triggers generation of a presentation for the user prompting the user to provide data indicative of a result of an inspection operation for the facade element. For example, FIG. 7 illustrates generally such a presentation, showing an operational phase of fabrication, along with selectable elements (e.g. buttons).

Use of the technique of FIG. 3 allows an operator or other user to retrieve a record associated with a facade element and to either update the status of the facade element (e.g., showing initiation or completion of an operation), or to enter information indicative of an inspection operation, such as documenting a defect. FIG. 6 illustrates generally an illustrative example of such a presentation. Such a presentation can be presented using a desktop computer, a laptop computer, an operator interface on a piece of fabrication equipment, or a mobile device such as a cellular phone or tablet, as illustrative examples. As an example, at 325, the user can optionally select a user-interface element such as a button on a graphical user interface, such as by touching a touch-screen display or clicking on the button using an input device. The facade element tracking system can receive the selection and can, in response, alter the status of the facade element in the corresponding record. For example, the status can be updated to indicate completion of a fabrication operation. As an example, at 335, the user can optionally select a user interface element such as a button, and the system can receive the selection and prompt the user to enter data indicative of an inspection. For example, as shown and described in other examples herein, the selection can indicate that the user wishes to reject the part or assembly, and the data indicative of the inspection can include reasons for rejection or other inspections operations.

The technique 300 can include automatically generating a report at 340, such as to indicate a status of a plurality of facade elements, either relative to a specified project, or a specified fabrication operation, as illustrative examples. Other reporting can be automatically generated, such as providing statistics concerning a particular operator or user, or statistics indicative of other items such as inspection results or defect lists. The technique 300 can include generating a packing list at 345. For example, as mentioned above, a user can scan identifiers corresponding to facade elements and the system can generate a packing list at 345, including optionally prompting the user to retrieve packing materials or tools specific to the scanned identifiers, for inclusion in a shipping unit. The tracking system performing the technique 300 can optionally prompt the user to capture an image of the elements being shipped or the shipping unit, or both, such as to document a condition of the elements prior to shipping in case damage occurs downstream.

Figure 4:
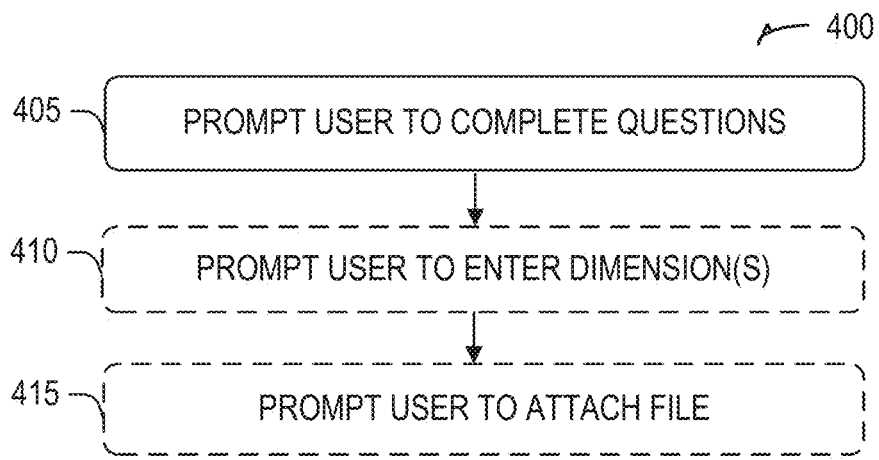
FIG. 4 illustrates generally a technique, such as a computer-implemented method, showing an example comprising prompting a user, such as via a graphical user interface, to complete a questionnaire, such as in relation to an inspection operation, and such as can be presented in a form similar to the illustrative examples of one or more of FIG. 7 or FIG. 8.
Figure 7:
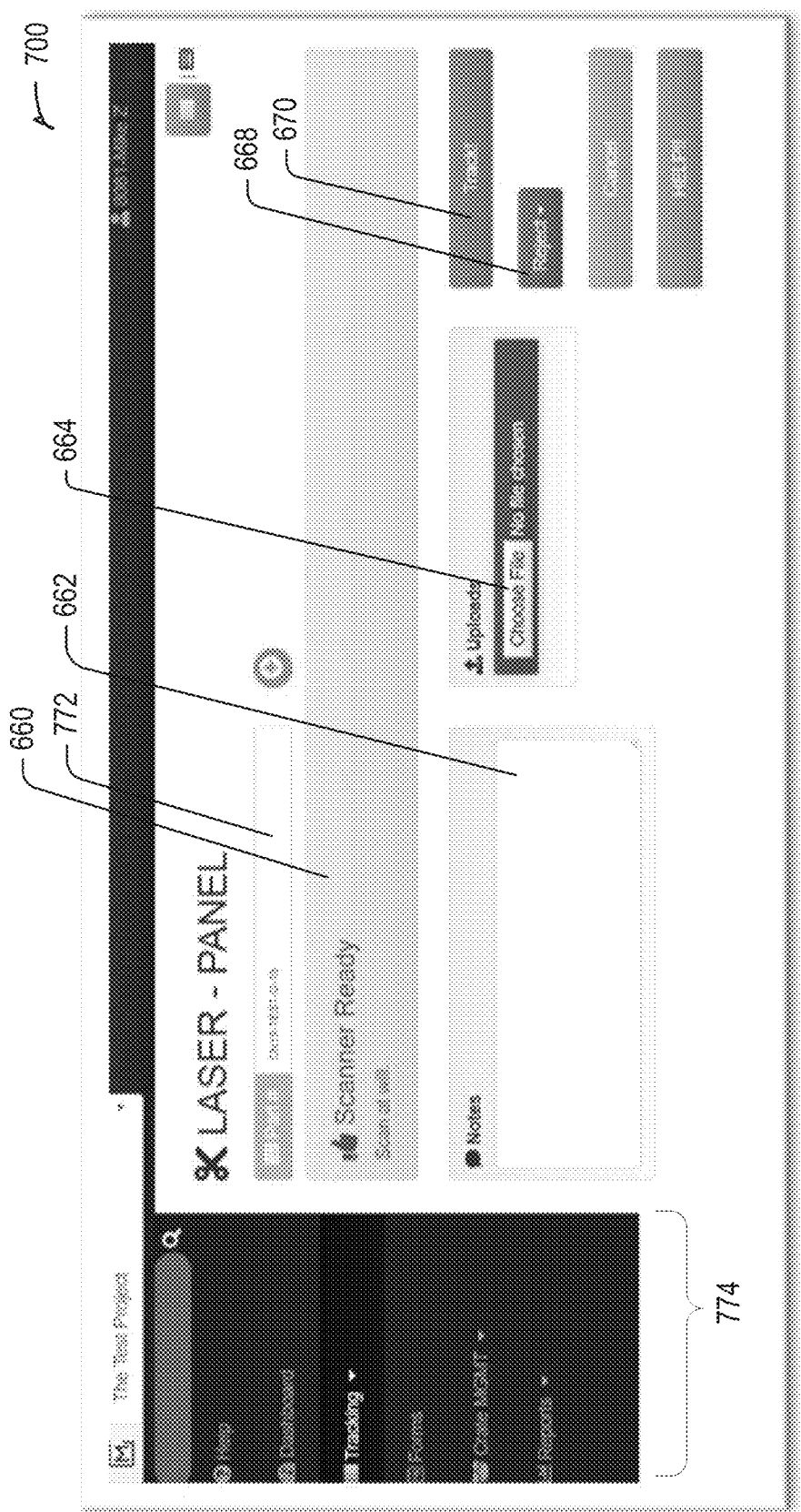
FIG. 7 illustrates generally an illustrative example comprising a presentation, such as can be presented to a user to provide a graphical user interface for interaction with automation provided by a facade element tracking system, such as in relation to a specified operation in a facade element workflow.
Figure 8:
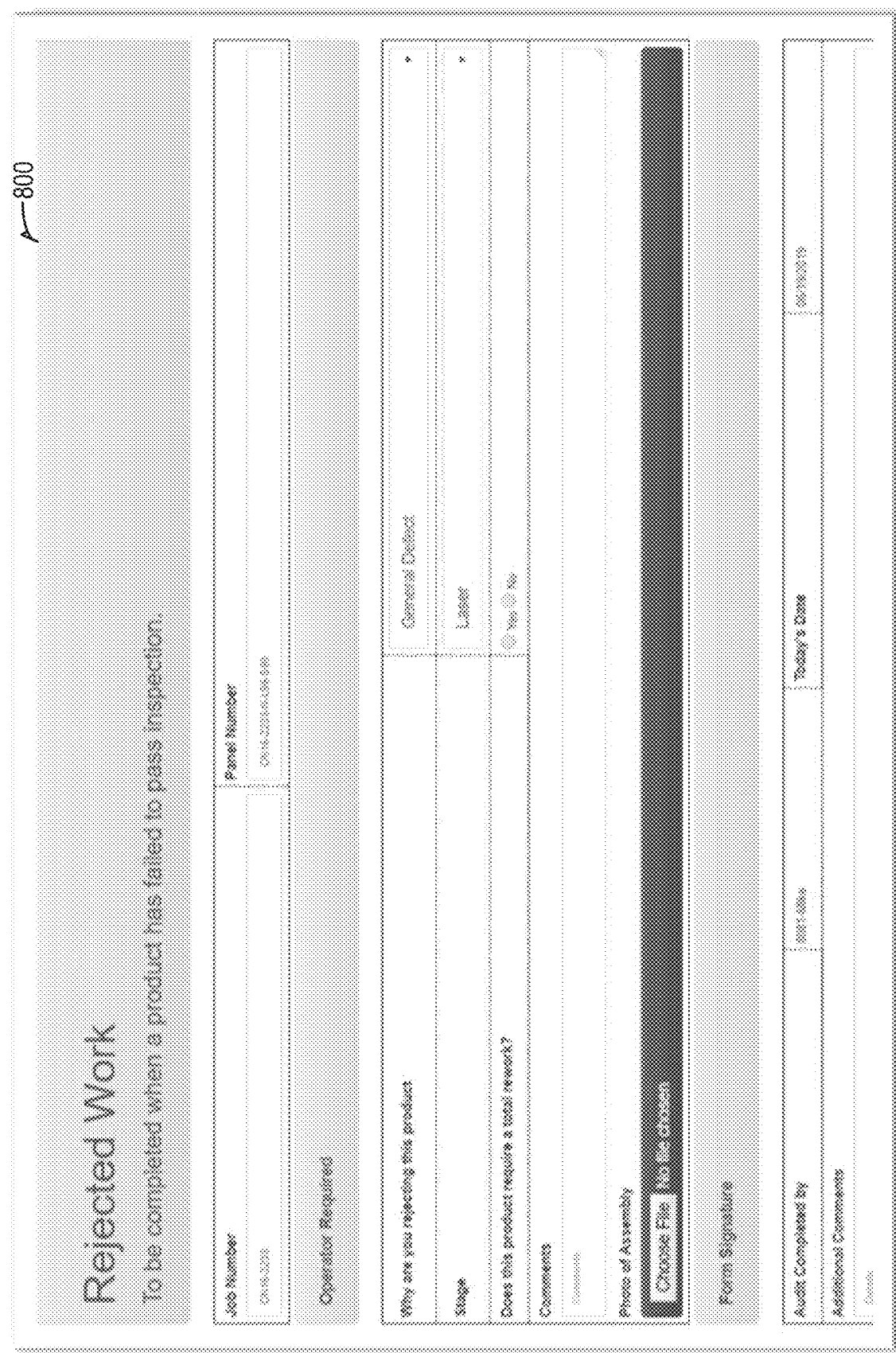
FIG. 8 illustrates generally an illustrative example comprising a presentation, such as can be presented to a user to provide a graphical user interface, such as to capture inspection or defect information from the user.

FIG. 4 illustrates generally a technique 400, such as a computer-implemented method, showing an example comprising prompting a user, such as via a graphical user interface, to complete a questionnaire, such as in relation to an inspection operation, and such as can be presented in a form similar to the illustrative examples of one or more of FIG. 7 or FIG. 8. For example, if an input from user is received indicating completion of a fabrication, shipment, or installation operation, the user may be prompted at 405 to complete a questionnaire. Such a questionnaire may be a routine or randomly-issued questionnaire relating to quality assurance, or the questionnaire may be in the form of a checklist performed as specified phases of fabrication, shipping, installation, or during other operations. For example, the user may be prompted at 410 to enter dimensions or other data indicative of inspection results, as mentioned elsewhere herein (e.g., bend locations, part dimensions, cut or scribe line locations, etc.). At 415, the user may be prompted to capture an image or otherwise attach a file. A status of the facade element may be updated in response to completion of a questionnaire or in response to specific elements in the questionnaire (e.g., user indicates that facade element has passed inspection or one or more values such as dimensions are automatically determined to fall within a specified range).

As an example, if the facade element tracking system is used across multiple sites, a vendor or manufacturing site may be asked to track production or inspection data relating to parts or raw materials and may be prompted to attach test data or inspection data, which are then associated with a facade element in a centralized repository. As an illustrative example, a facade element such as a metal panel may include use of sheet stock having a specified surface finish. Test data indicative of the surface finish (e.g., roughness or colorimetry measurements) can be entered at 415 and the data may be associated with intermediate or finished panels to form a record from raw material through installation corresponding to the panel or other element.

In another example, the system may receive an indication from a user (e.g., clicking on or touching a "reject!" button on a graphical user interface) causing the technique 400 to prompt the user to document the rejection, such as prompting the user to capture or attach a photo at 415 showing the defect.

Figure 5:
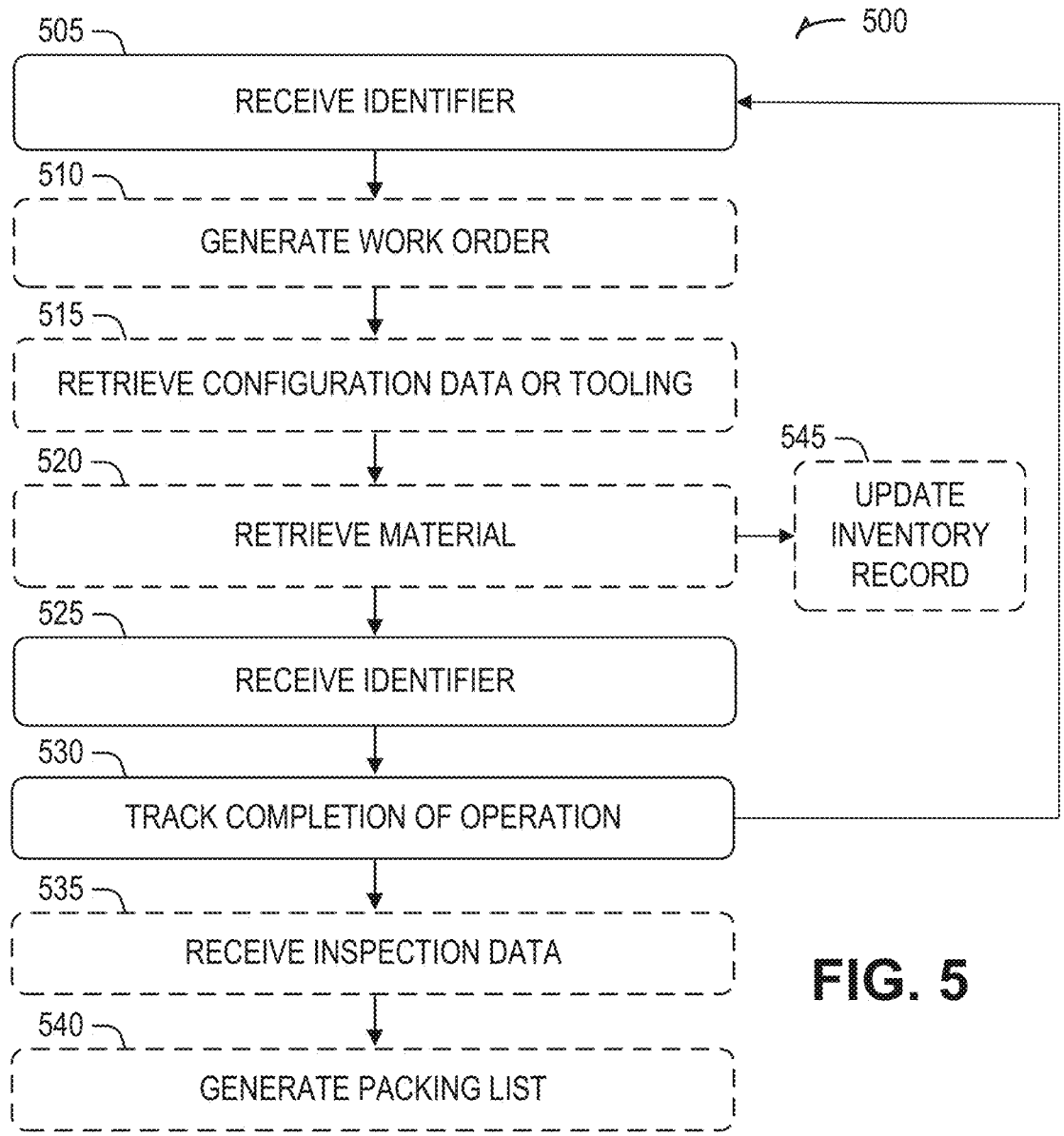
FIG. 5 illustrates generally a technique, such as a computer-implemented method, showing an example comprising operations that can be performed, such as support of fabrication operations relating to facade elements including related automated tracking as provided by the present subject matter.

FIG. 5 illustrates generally a technique 500, such as a computer-implemented method, showing an example comprising operations that can be performed, such as support of fabrication operations relating to facade elements including related automated tracking as provided by the present subject matter. At 505, an identifier is received, such as a unique identifier corresponding to an individual facade element to be fabricated. The identifier can include a bar code attached to a sheet of stock. In an example, the identifier can be included as a portion of a project work order. For example, at 510, in response to receiving an identifier indicative of a specified project or a specified assembly, a work order can be generated for fabrication of one or more facade elements such as individual parts comprising the assembly or otherwise forming a portion of the project. Generally, the identifier received at 505 corresponds to part or assembly being fabricated. At 515, optionally, configuration data such as a setup file or specified tooling can be automatically identified for use in fabricating the part or assembly.

At 520, optionally, material can be retrieved, or a bill-of-materials can be generated or updated to indicate materials used for the fabrication operation. Optionally, at 545, an inventory record can be updated to indicate usage of material such as sheet stock. Upon completion of a fabrication operation, the identifier 525 can be received again, and the technique 500 can include tracking completion of an operation. As an illustrative example, an operator can receive either raw material or a part in-process and can scan a barcode affixed to the raw material or part-in-process or otherwise associated with the raw material or part-in-process. The system can receive the identifier at 505 and can update a corresponding record to show that the part is in-process at the operator station. Upon completion of the operation, the operator can again scan the identifier at 525, and the system can track completion of the operation at 530. Operations such as 505 through 530 can be repeated for different fabrication operations, such as marking, cutting, or bending, as illustrative examples.

Optionally, such as at 535, inspection data can be received, either in response to prompting the user to enter such data as mentioned elsewhere, or in response to receiving an indication from a user that a defect report or other inspection observation is to be made. Optionally, such as at 540, a packing list can be generated, such as after other fabrication operations are logged as complete by the system. As mentioned in relation to other examples herein, packing list generation can include prompting a user to provide specified packing materials or tools in the shipping unit, and can facilitate capture of documentation of the shipping unit such as receiving imaging data of the container prior to being sealed and shipped.

FIG. 6 illustrates generally an illustrative example comprising a presentation 600, such as can be presented to a user to provide a graphical user interface for interaction with automation provided by a facade element tracking system. The presentation can be displayed using a desktop, laptop, tablet, or cellular device. User input can be received in response to a user pressing one or more buttons using a touch-screen or digitizer, or in response to user input provided by other input devices such as a keyboard or mouse. The presentation 600 of FIG. 6 can include an indicium 660 that the facade element tracking system is ready to receive an identifier corresponding to a facade element. Such an identifier can be provided using a camera from a mobile device or a fixed camera, or using a fixed or hand-held bar code scanner, as illustrative examples. Other tagging techniques can be used, such as providing the identifier by placing a proximity scanner or wireless scanner nearby an RFID tag or moving a part across a static scanner. The presentation 600 can include buttons allowing a user to enter notes at 662 concerning an identified (e.g., "active") facade element, or to track the facade element at 670 (e.g., to document that the facade element has entered or exited a fabrication operation, for example). At 668, a user selection to reject the facade element can be received, such as providing a drop-down menu of commonly-used defect descriptions. At 664, a user selection can be received to prompt the user to upload a file such as a photo or other data concerning the identified facade element.

FIG. 7 illustrates generally an illustrative example comprising a presentation 700, such as can be presented to a user to provide a graphical user interface for interaction with automation provided by a facade element tracking system, such as in relation to a specified operation in a facade element workflow. The presentation of FIG. 7 can include elements similar to FIG. 6, but can also present other elements such as a sidebar 774 for accessing other portions of the tracking system. For example, in the presentation 700, a part number corresponding to a received identifier 772 has been loaded and the presentation 700 indicates that the tracked part is at a panel-level laser-cutting operation. Receiving a user selection indicating "Track!" at 670 will log completion of the laser-cutting operation in this illustrative example. Optionally, the system can receive notes entered by a user at 662 or an attached file at 664, such as associating such items with the selected identifier 772. Other portions of the tracking system can be access such as by receiving a user selection to perform shipping crate management, report generation, or dashboard display using the drop-down menus accessible from the sidebar 774. If an indication is received from the user to "Reject!" the identified part corresponding to the identifier 772, a questionnaire or other display can be generated. Permissions can be established in a secure manner so that specified users only see certain specified options in the sidebar 774 or are only able to select certain buttons or other inputs. As mentioned above, operations performed by a user such as tracking of completion of fabrication operations or logging defect reports can be associated with a unique user identifier, such scanned in manner similar to scanning facade element identifiers.

For example, FIG. 8 illustrates generally an illustrative example comprising a presentation 800, such as can be presented to a user to provide a graphical user interface, such as to capture inspection or defect information from the user. The form of the rejected work (or other form) can be modified by an administrative user, and pertinent details concerning the rejected part can be captured as shown generally in FIG. 8. Other questionnaires or forms can be presented, such as before, during, or after specified operations. For example, inspection operations can be triggered with corresponding forms upon completion of specified operations or on a random (e.g., lot-sampling) basis.

Figure 9:
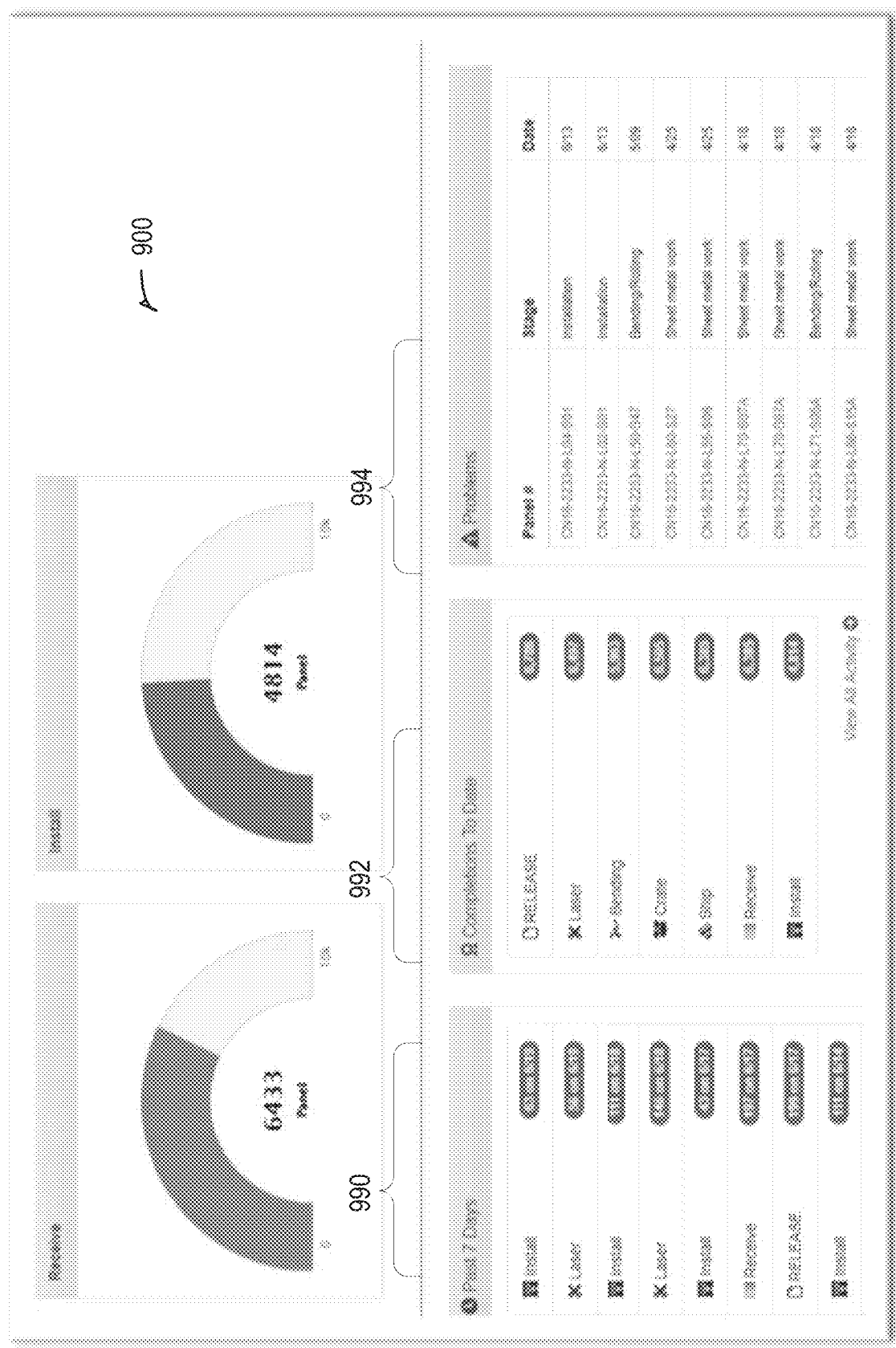
FIG. 9 illustrates generally an illustrative example comprising a presentation, such as can be presented to a user to provide a dashboard or other reporting of data assembled using a facade element tracking system as shown and described herein.

FIG. 9 illustrates generally an illustrative example comprising a presentation 900, such as can be presented to a user to provide a dashboard or other reporting of data assembled using a facade element tracking system as shown and described herein. The reports shown in FIG. 9 can provide a master design or project-level view of tracked facade elements. For example, a region 990 can show counts of various tracked operations over a specified prior duration (e.g., over the last seven days or some other duration). A region 992 can show cumulative counts of various tracked operations to date. A region 994 can show defect or other inspection observations, such as providing abbreviated data concerning a phase or nature of the observation. In the example of FIG. 9, the region 994 illustrates a panel number (e.g., a unique identifier corresponding to individual facade panels), and a corresponding tracked operation where the defect or other observation was reported. The graphical meters shown in FIG. 9 show cumulative counts of a facade elements received on-site at the job site, and installed at the job site. Other dashboard formats can be generated within the tracking system, such as showing a "leaderboard" of users, operators, or fabrication operations having a highest throughput of operations or a lowest defect rate, as illustrative examples.

Figure 10:
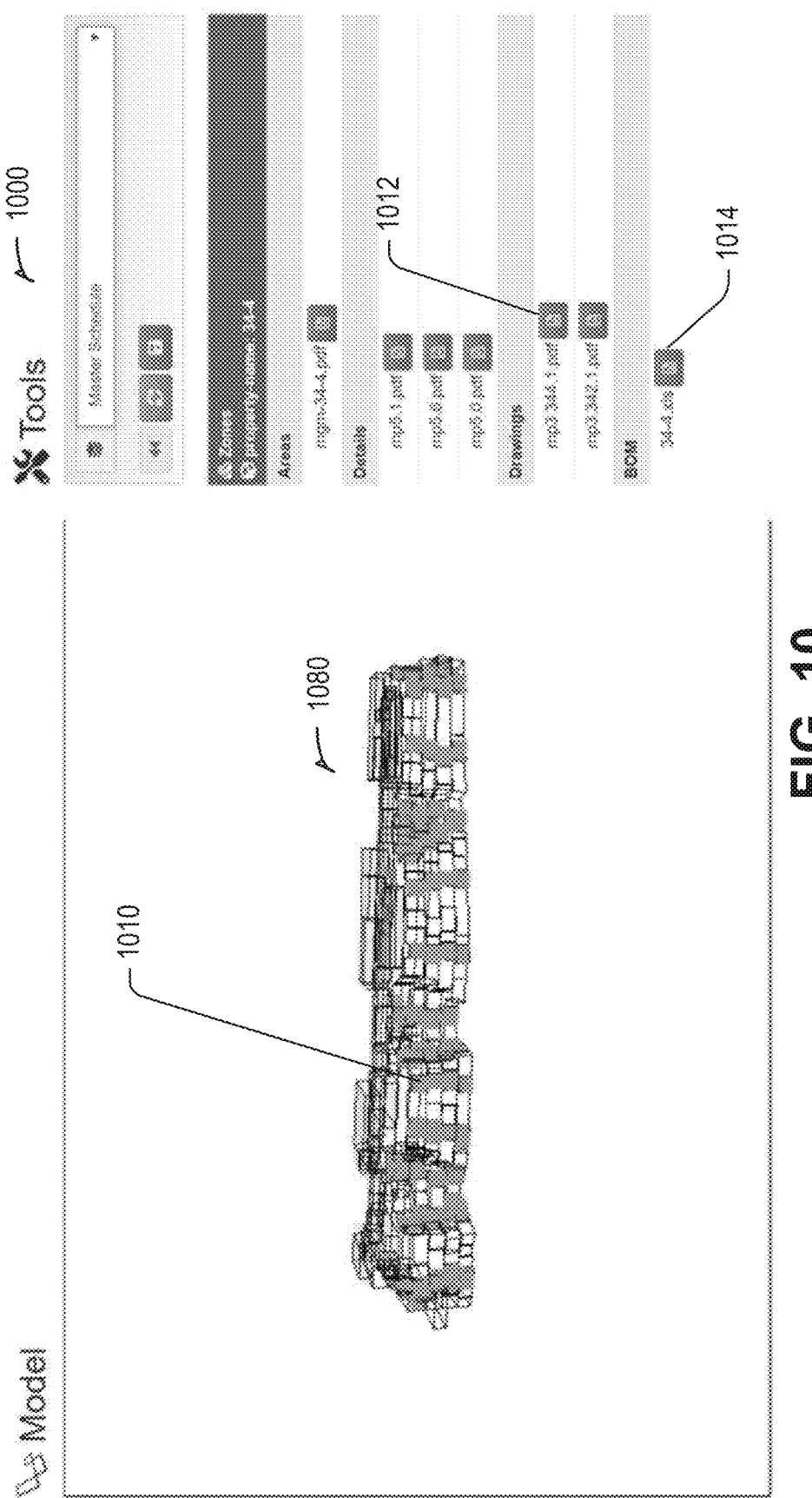
FIG. 10 illustrates generally an illustrative example comprising a presentation, such as can be presented to a user to provide a graphical representation of at least a portion of a specified project including a visual indicium showing a location of the facade element amongst other ones of the multiple facade elements in an installation.

FIG. 10 illustrates generally an illustrative example comprising a presentation 1000, such as can be presented to a user to provide a graphical representation of at least a portion of a specified project (e.g., a master design 1080) including a visual indicium 1010 showing a location of the facade element amongst other ones of the multiple facade elements in an installation. As an illustrative example, a user can provide an identifier such as scanning or keying in the identifier and the corresponding location or locations in the master design 1080 using the facade element can be highlighted, such as shaded or colored to indicate such locations. A sidebar in the presentation 1000 can automatically generate selectable elements corresponding to supporting details concerning one or more of the master design 1080, an assembly, or individual selected parts. For example, the indicium 1010 corresponding to a selected element allows retrieval by the system of supporting drawings, such as by receiving a indication at 1012 from a user to retrieve a drawing, or a bill-of-materials at 1014, as illustrative examples. In this manner, a user can explore a design 1080 and rapidly retrieve corresponding documentation concerning an "active" facade element that has been scanned. In an example, a user can click or touch portions of the representation of the master design 1080 or re-orient the representation of the maser design 1080 to select portions of the master design 1080 and corresponding details concerning a newly-selected element can be displayed in the sidebar in response to receiving the user selection via the representation of the maser design 1080.

Figure 11:
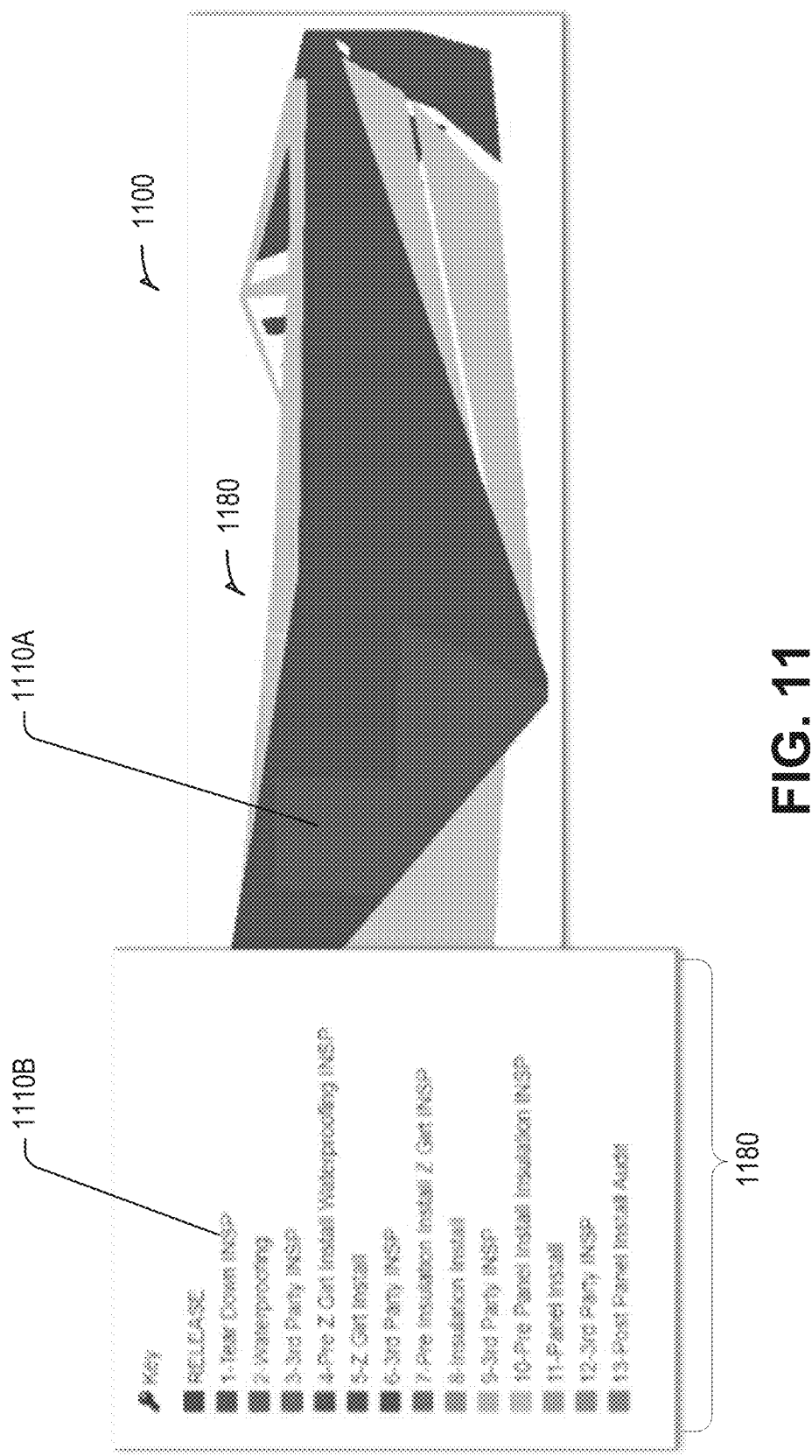
FIG. 11 illustrates generally an illustrative example comprising a presentation, such as can be presented to a user to provide a graphical representation of at least a portion of a specified project including visual indicia showing a status of respective facade elements in an installation.

Similarly, FIG. 11 illustrates generally an illustrative example comprising a presentation 1100, such as can be presented to a user to provide a graphical representation of at least a portion of a specified project including visual indicia showing a status of respective facade elements in an installation. For example, a master design 1180 can be displayed and regions such as a region 1110A can be shaded, patterned, or colored differently than other regions to provide an indication of a status of facade elements located in the region 1110A. For example, as shown in the key 1110B, several different operations can be represented by the presentation 1100, such as concerning one or more of installation, inspection, or other on-site operations. A presentation 1100 can also be used to display a fabrication status or an indication as to whether elements to be located in the region 1110A have been received or shipped, as illustrative examples.

Figure 12:
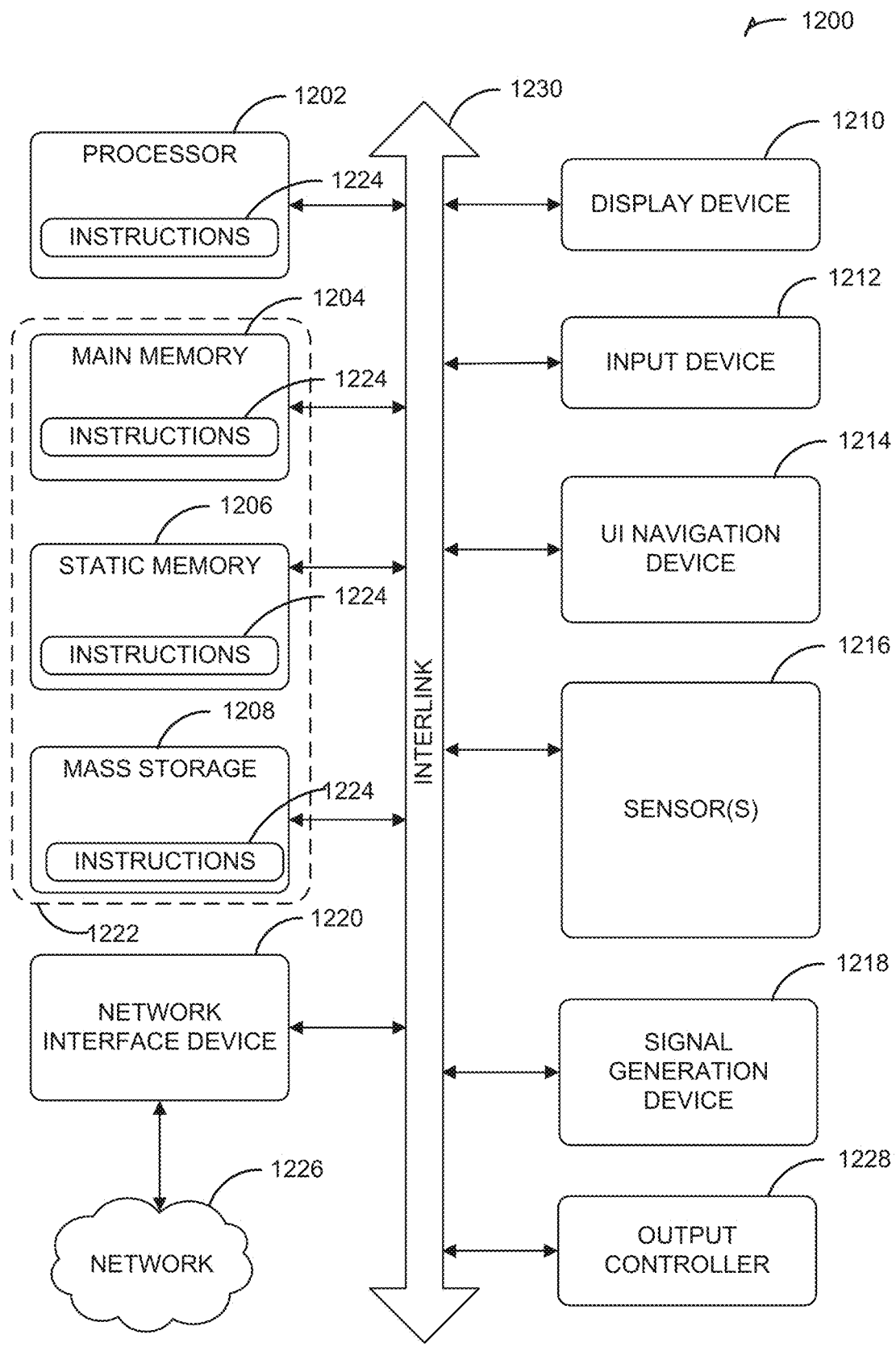
FIG. 12 illustrates a block diagram of an example comprising a machine upon which any one or more of the techniques (e.g., methodologies) discussed herein may be performed.

Generally, the presentations described in this document can be machine-generated or other techniques described herein can be machine implemented and such presentations can be provided as user-accessible elements of a tracking system (such as a system 200 as shown in FIG. 2 to assist in tracking facade elements through a framework 100 as shown in FIG. 1). The tracking system can be accessible via a browser or otherwise instantiated as a run-time client configured to communicate with a server or other resource. FIG. 12 illustrates a block diagram of an example comprising a machine 1200 upon which any one or more of the techniques (e.g., methodologies) discussed herein may be performed. In various examples, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for tracking of facade elements for a structure, the method comprising:
receiving an identifier indicative of a facade element, the identifier scanned from the facade element;
in response, automatically retrieving a record corresponding to the facade element and generating a presentation for a user indicative of at least a portion of the record, the presentation including:
an indicium of a status of the facade element relative to a specified project comprising multiple facade elements; and
at least one selectable element comprising a first selectable element that, in response to user selection, alters the status of the facade element within the record; and
retrieving data indicative of one or more of tooling or fabrication equipment configuration data, based on the retrieved record.

2. The method of claim 1, comprising generating a work order relating to the facade element relative to the specified project comprising multiple facade elements, based on the retrieved record, the work order corresponding to the data indicative of one or more of tooling or fabrication equipment configuration data.

3. The method of claim 1, wherein retrieving the data comprises retrieving fabrication equipment configuration data comprising one or more operational instructions that, when executed by fabrication equipment, cause the fabrication equipment to perform at least one of (1) a machining operation, (2) a folding operation, (3) a scoring operation, or (4) a cutting operation.

4. The method of claim 1, wherein the presentation comprises a second selectable element that, in response to user selection, triggers generation of a presentation for the user prompting the user to provide data indicative of a result of an inspection operation for the facade element.

5. The method of claim 4, wherein, in response to user selection of the second selectable element, the method comprises generating a presentation for the user prompting the user to provide an image and a corresponding description documenting the inspection operation.

6. The method of claim 5, wherein the inspection operation occurs during or after a fabrication operation associated with the retrieved tooling or fabrication equipment configuration data.

7. The method of claim 5, wherein the inspection operation corresponds to a fabrication operation associated with the retrieved tooling or fabrication equipment configuration data.

8. The method of claim 4, wherein a status of the of the facade element is updated in response to a received indication from a user indicative of whether the facade element satisfies one or more criteria corresponding to the inspection operation.

9. The method of claim 8, wherein the one or more criteria include at least one of a dimensional criterion or a surface condition criterion.

10. The method of claim 9, wherein the surface condition criterion comprises a color specification.

11. The method of claim 8, wherein the one or more criteria include at least one criterion relating to a shape or location of (1) a scribe, (2) an etch, (3) a cut, or (4) a fold in the facade element.

12. The method of claim 1, wherein the facade element comprises at least one of a metal panel, a composite panel, a panel including glass, a panel including stone, a panel including a polymer material, a panel including a ceramic material, a portion of a metal panel assembly, a portion of a composite panel assembly, a portion of a stone panel assembly, a portion of a ceramic panel assembly, a portion of a polymer panel assembly, or a portion of a glass panel assembly.

13. The method of claim 1, wherein receiving the identifier includes receiving data indicative of the identifier obtained using an optical scanner or camera, the identifier encoded using a bar code applied to the facade element.

14. The method of claim 1, comprising, in response to receiving the identifier indicative of the facade element, generating for presentation a graphical representation of at least a portion of the specified project including a visual indicium showing a location of the facade element amongst other ones of the multiple facade elements in an installation.

15. The method of claim 14, wherein the visual indicium includes at least one of coloring or shading the facade element.

16. The method of claim 14, wherein the visual indicium includes a visual indication of the status of the facade element.

17. A system for tracking of facade elements for a structure, the system comprising:
a user device comprising at least one processor circuit and at least one memory circuit, the memory circuit comprising instructions that, when executed by the at least one processor circuit, cause the user device to:
receive an identifier indicative of a facade element, the identifier scanned from the facade element;
in response, automatically retrieve a record corresponding to the facade element and generate a presentation for a user indicative of at least a portion of the record, the presentation including:
an indicium of a status of the facade element relative to a specified project comprising multiple facade elements; and
at least one selectable element comprising a first selectable element that, in response to user selection, alters the status of the facade element within the record; and
retrieve data indicative of one or more of tooling or fabrication equipment configuration data, based on the retrieved record.

18. The system of claim 17, wherein the fabrication equipment configuration data includes one or more of operational instructions that, when executed by fabrication equipment, cause the fabrication equipment to perform at least one of (1) a machining operation, (2) a folding operation, (3) a scoring operation, or (4) a cutting operation.

19. The system of claim 17, wherein the user device is coupled to a display or comprises a display; and
wherein the instructions comprise instructions to, in response to user selection of a second selectable element, generate a presentation for the user prompting, via the display, the user to provide an image and a corresponding description documenting an inspection operation.

20. A method for tracking of facade elements for a structure, the method comprising:
receiving an identifier indicative of a facade element, the identifier scanned from the facade element;
in response, automatically retrieving a record corresponding to the facade element and generating a presentation for a user indicative of at least a portion of the record, the presentation including:
an indicium of a status of the facade element relative to a specified project comprising multiple facade elements; and
at least one selectable element comprising a first selectable element that, in response to user selection, alters the status of the facade element within the record;
based on the retrieved record, retrieving fabrication equipment configuration data comprising one or more operational instructions that, when executed by fabrication equipment, cause the fabrication equipment to perform at least one of (1) a machining operation, (2) a folding operation, (3) a scoring operation, or (4) a cutting operation; and
generating a work order relating to the facade element relative to the specified project comprising multiple facade elements, based on the retrieved record, the work order corresponding to the retrieved fabrication equipment configuration data.

\* \* \* \* \*